United States Patent [19]

Shinoda et al.

[11] Patent Number: 5,196,464
[45] Date of Patent: Mar. 23, 1993

[54] RUBBER COMPOSITIONS

[75] Inventors: Shigeru Shinoda, Chigasaki; Masayoshi Daio, Hiratsuka, both of Japan

[73] Assignee: The Yokohama Rubber Co., Ltd., Tokyo, Japan

[21] Appl. No.: 698,098

[22] Filed: May 10, 1991

[30] Foreign Application Priority Data

Jun. 6, 1990 [JP]   Japan ................................ 2-146130

[51] Int. Cl.⁵ ............................................ C08K 5/3477
[52] U.S. Cl. ................................... 524/100; 524/102; 524/398; 524/432; 524/353
[58] Field of Search ........................ 524/100, 102, 398

[56] References Cited

U.S. PATENT DOCUMENTS 4,550,147 10/1985 Oohara ................................ 525/133

Primary Examiner—Melvyn I. Marquis
Assistant Examiner—Mark Sweet
Attorney, Agent, or Firm—Finnegan, Henderson, Farabow, Garrett & Dunner

[57] ABSTRACT

A rubber composition for steel-belted automobile tires containing selected amounts of partial condensates of hexamethylolmelamine pentamethylether, cresol resin, sulfur and cobalt salts of organic acid, to improve its warm water to steel cords in the tire and increased tensile strength.

5 Claims, No Drawings

RUBBER COMPOSITIONS

BACKGROUND OF THE INVENTION

1. Field of the Invention

This invention relates to rubber compositions and has particular reference to rubber compositions suitable for use in the manufacture of steel-belted automobile tires.

2. Prior Art

Steel-belted tires are in widespread use for their inherent advantages of good driving stability, high wear resistance and other superior physical properties compared to conventional tires. Research, efforts have been focused, inter alia, on improving the of adhesion between rubber layers and steel cords which has an important bearing upon the quality of the tires. This adhesion parameter determines the service life of the tire exposed to various environmental conditions during and subsequent to its processing stage and shipment to the end user. In the manufacture of a steel-belted tire, the starting rubber possesses sufficient "initial adhesion" with steel cords at the time of vulcanization. Unvulcanized rubber, however, is susceptible to absorption of moisture and hence its adhesive property, namely "unvulcanized moisture resistant adhesion", tends to decline upon vulcanization. Vulcanized rubber is also liable to suffer a reduction in its adhesive property, namely "vulcanized moisture resistant adhesion", due to penetration of moisture in the air through the rubber layer into the steel cords during the use of tire. It is further possible that if the tire receives cuts, nail punctures and other damage to its tread portion during running of the automobile, which will allow permeation of water therethrough, this water is warmed up by the heat generated in the running tire and flows through the interstices of the steel cords, causing the rubber to separate due to a loss of its adhesive property; namely "vulcanized warm water resistant adhesion".

The terms quoted above represent all aspects of the adhesive property required of rubber compositions for steel-belted tires.

Various tire rubber composition are known which are capable of meeting some, but not all of the above adhesion requirements.

The vulcanization process in the manufacture of steel-belted tires holds the key to productivity as a whole. Vulcanization time can be shortened by increasing its temperature. However, conventional rubber compositions containing cobalt salts of organic acids, though believed conducive to adhesion with steel cord, are liable to suffer a decline in their "unvulcanized moisture resistant adhesion", "vulcanized moisture resistant adhesion" and "vulcanized warm water resistant adhesion" because of the higher vulcanization temperature.

It is known to choose high hardness and high modulus rubbers to cover hard steel cords for steel-belted tires. Such hard rubbers often incorporate large quantities of sulfur and carbon black and exhibit increased hardness and modulus upon vulcanization. At the same time, however, they tend to deteriorate in tensile strength and breaking extension.

SUMMARY OF THE INVENTION

With the foregoing difficulties of the prior art in mind, the present, invention seeks to provide rubber compositions that will have enhanced adhesive strength with respect to steel cords in terms of "initial adhesion", "unvulcanized moisture resistant adhesion", "vulcanized moisture resistant adhesion" and "vulcanized warm water resistant adhesion", with all these adhesive properties being retained even using high temperature vulcanization. Further that they will possess high hardness and excellent breaking extension property.

The inventive rubber compositions are therefore particularly useful and effective in coating the steel cords used in steel-belted tires.

The rubber composition according to the invention comprises 100 parts by weight of a starting rubber, and, based on the rubber, 1.0–5 parts by weight of partial condensates of hexamethylolmelamine pentamethylether 0.5–5 parts by weight of a cresol resin 4–7 parts by weight of sulfur and 0.1–0.8 parts by weight of a cobalt salt of organic acid based on the amount of cobalt element.

DETAILED DESCRIPTION OF THE INVENTION

The rubber composition of the invention essentially comprises the following components.

i) Starting Rubber

Natural rubber (NR) alone or in combination with synthetic isoprene rubber (IR).

ii) Partial Condensates of Hexamethylolmelamine Pentamethylether of the Formula

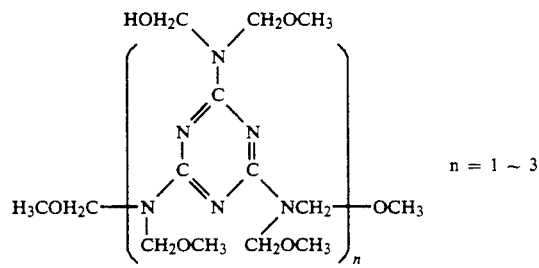

These partial condensates are commercially available such as for example Sumicanol 507 (tradename of Sumitomo Chemicals Co., Ltd.) which contains 50% of hexamethylolmelamine pentamethylether partial condensates. Other polymethoxymethylolmelamines for example hexamethoxymethylmelamine are not eligible for the purpose of the invention. The hexamethylolmelamine pentamethylether according to the invention should be used in an amount of 1.0–5 parts by weight per 100 parts by weight of the starting rubber. Smaller amounts than 1.0 weight parts would result in insufficient rubber hardness, and larger than 5 weight parts would lead to reduced breaking extension.

iii) Cresol Resin

This may be one readily available in commerce and is preferably meta-cresol resin which should be used in an amount of 0.5–5 parts by weight per 100 parts by weight of the starting rubber. Less than 0.5 weight part would result in insufficient rubber hardness, and more than 5 weight parts would lead to reduced breaking extension and to objectionably increased heat in vulcanized rubber.

iv) Sulfur

The amount of sulfur to be added should be 4–7 parts by weight per 100 parts by weight of the starting rubber. Less than 4 weight parts would be ineffective, while more than 7 weight parts would result in bloomed rubber surface.

v) Cobalt Salts of Organic Acid

Typical examples include straight chain or branched cobalt salts of monocarboxylic acid having a carbon number of 50-20 such as cobalt naphthenate, cobalt stearate, cobalt octylate and cobalt oleate. These cobalt salts should be added in an amount of 0.1–0.8 weight parts in terms of cobalt element per 100 weight parts of the starting rubber. Departures from this range would serve no useful purposes.

vi) Other Additives

There may be used other suitable additives such as carbon black, a vulcanization accelerator and the like depending upon the particular application for the rubber composition.

Comparative and Inventive Examples

For purposes of brevity, the formulations of the various rubber compositions for the Comparative Examples and Inventive Examples are shown in Tables 1 and 2 respectively along with their respective test results.

Metal Adhesion Test

1) Initial Adhesion

Brass plated steel cords (1×5 strand) spaced 12.5 mm apart in parallel were coated from both sides with each of the rubber compositions into a 25 mm wide web which was subsequently vulcanized at 170° C. for 20 minutes. The resulting test sample was subjected to drawing of the steel cords in accordance with the procedures of ASTM:D2229. Draw strength (index) and rubber coat percentage (%) were measured to determine the "initial adhesion" of the rubber composition.

2) Vulcanized Warm Water Resistant Adhesion

The test sample was immersed in 70° water with lower end cords cut and thus disposed for four consecutive weeks, followed by drawing of the cords.

Separation Test

A tire fabricated with a belt layer consisting of steel cords coated with each of the rubber compositions was inflated to an air pressure of 1.2 kg/cm$^2$ and run on a test drum set with slip angle of ±3°, camber angle of 2° and load of 127% (JATMA standards) at a speed of 60 km/hr for a distance of 6,000 km. The tire was dismantled, and the extent or amount of separation of an end portion of the belt layer was measured, in which instance the value in Comparative Example 2 was taken as a reference index. Test results are better the smaller the index value.

TABLE 1

|  | Comparative Examples | | | | | | |
|---|---|---|---|---|---|---|---|
|  | 1 | 2 | 3 | 4 | 5 | 6 | 7 |
| natural rubber (RSS #1) | 100 | 100 | 100 | 100 | 100 | 100 | 100 |
| carbon black (HAF) | 60 | 60 | 60 | 60 | 60 | 60 | 60 |
| zinc oxide | 10 | 10 | 10 | 10 | 10 | 10 | 10 |
| aging inhibitor (phenylenediamine) | 1 | 1 | 1 | 1 | 1 | 1 | 1 |
| cobalt-naphthenate *1 | 3 (0.3) | 3 (0.3) | 3 (0.3) |  | 3 (0.3) | 3 (0.3) | 3 (0.3) |
| cobalt stearate *1 |  |  |  | 3 (0.3) |  |  |  |
| sulfur | 6 | 6 | 6 | 6 | 6 | 6 | 6 |
| accelerator *2 | 0.7 | 0.7 | 0.7 | 0.7 | 0.7 | 0.7 | 0.7 |
| meta-cresol resin *3 | 1 | 1 | 1 | 1 | 2 | 4 | 4 |
| hexamethoxy-methylmelamine *4 | 2 | 4 | 6 | 4 | 4 | 4 | 6 |
| hexamethylolmelamine pentamethylether partial condensate *5 |  |  |  |  |  |  |  |
| vulcanization properties (160° C. × 20 min) |  |  |  |  |  |  |  |
| tensile strength | 250 | 238 | 221 | 231 | 240 | 245 | 240 |
| breaking extension | 390 | 345 | 305 | 340 | 355 | 365 | 340 |
| hardness (JIS A) | 74 | 76 | 77.5 | 76.5 | 76.5 | 78 | 79 |
| initial adhesion (170° C. × 20 min) |  |  |  |  |  |  |  |
| draw strength | 97 | 100 | 97 | 99 | 100 | 99 | 98 |
| rubber coat (%) | 95 | 95 | 95 | 95 | 95 | 95 | 95 |
| vulcanized warm water resistant adhesion (170° C. × 20 min) |  |  |  |  |  |  |  |
| draw strength | 60 | 64 | 65 | 64 | 62 | 63 | 67 |
| rubber coat (%) | 50 | 64 | 68 | 60 | 65 | 67 | 70 |
| separation test | 110 | 100 | 90 | 90 | 90 | 85 | 85 |

TABLE 2

|  | Inventive Examples | | | |
|---|---|---|---|---|
|  | 1 | 2 | 3 | 4 |
| natural rubber (RSS #1) | 100 | 100 | 100 | 100 |
| carbon black (HAF) | 60 | 60 | 60 | 60 |
| zinc oxide | 10 | 10 | 10 | 10 |
| aging inhibitor (phenylenediamine) | 1 | 1 | 1 | 1 |
| cobalt-naphthenate *1 | 3 (0.3) | 3 (0.3) | 3 (0.3) | 3 (0.3) |
| cobalt stearate *1 |  |  |  |  |
| sulfur | 6 | 6 | 6 | 6 |
| accelerator *2 | 0.7 | 0.7 | 0.7 | 0.7 |
| meta-cresol resin *3 | 1 | 1 | 2 | 4 |
| hexamethoxy-methylmelamine *4 |  |  |  |  |
| hexamethylolmelamine pentamethylether | 2 | 4 | 4 | 6 |

TABLE 2-continued

|  | Inventive Examples | | | |
|---|---|---|---|---|
|  | 1 | 2 | 3 | 4 |
| partial condensate *5 vulcanization properties (160° C. × 20 min) | | | | |
| tensile strength | 255 | 246 | 250 | 255 |
| breaking extension | 400 | 380 | 375 | 360 |
| hardness (JIS A) | 77.5 | 79.5 | 81 | 83 |
| initial adhesion (170° C. × 20 min) | | | | |
| draw strength | 98 | 100 | 102 | 101 |
| rubber coat (%) | 95 | 95 | 95 | 95 |
| vulcanized warm water resistant adhesion (170° C. × 20 min) | | | | |
| draw strength | 73 | 78 | 80 | 79 |
| rubber coat (%) | 78 | 82 | 86 | 85 |
| separation test | 70 | 60 | 50 | 50 |

Note:
*1 each contains 10 weight % of cobalt element
*2 N,N'-dicyclohexylbenzothiazole sulfenamide
*3 Sumicanol 610 (by Sumitomo Chemical Co., Ltd.)
*4 Cyrez 964 (by American Cyanamid Co.)
*5 Sumicanol 507 (containing 50% partial condensates of hexamethylolmelamine pentamethylether)

What is claimed is:

1. A rubber composition having increased warm water adhesion consisting essentially of 100 parts by weight of a starting rubber and, based on said weight of the rubber, from 1.0 to 5 parts by weight of partial condensates of hexamethylolmelamine pentamethylether having the formula

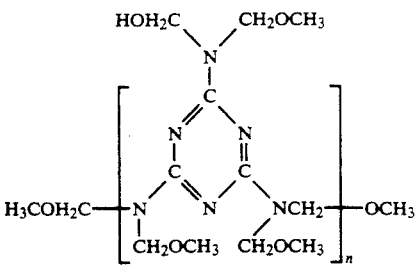

where n = 1 to 3; from 0.5 to 5 parts by weight of a meta cresol resin; from 4 to 7 parts by weight of sulfur; and from 0.1 to 0.8 parts by weight of a cobalt salt of an organic acid in terms of the cobalt element.

2. The rubber composition of claim 1, wherein said starting rubber is natural rubber alone or in combination with a synthetic isoprene rubber.

3. The rubber composition of claim 1, wherein said cobalt salt of an organic acid is a cobalt salt of a straight chain or branched monocarboxylic acid having a carbon number of from 5-20.

4. The rubber composition of claim 3, wherein said cobalt salt is selected from the group consisting of cobalt naphthenate, cobalt stearate, cobalt octylate and cobalt oleate.

5. The rubber composition of claim 1, containing at least one non-adhesive additive selected from the group consisting of zinc oxide, carbon black, a vulcanization accelerator and an aging inhibitor.

* * * * *

UNITED STATES PATENT AND TRADEMARK OFFICE
CERTIFICATE OF CORRECTION

PATENT NO. : 5,196,464
DATED : March 23, 1993
INVENTOR(S) : Shigeru Shinoda et al.

It is certified that error appears in the above-identified patent and that said Letters Patent is hereby corrected as shown below:

IN THE ABSTRACT:

Line 5, after "water", insert --adhesion--.

Signed and Sealed this

Thirty-first Day of May, 1994

Attest:

BRUCE LEHMAN

Attesting Officer

Commissioner of Patents and Trademarks